United States Patent [19]

Springer, Sr.

[11] 4,097,059
[45] Jun. 27, 1978

[54] CONNECTING BRACKET ARRANGEMENT FOR TOWING LAWN MOWER

[76] Inventor: Joseph E. Springer, Sr., Star Rte. 2, Box 2116, Hernando, Fla. 32642

[21] Appl. No.: 726,495

[22] Filed: Sep. 27, 1976

[51] Int. Cl.² ................ B62D 13/00; B62K 27/12
[52] U.S. Cl. .................... 280/204; 56/15.6; 280/460 A
[58] Field of Search ........... 180/14 R, 14 A, 14 B, 180/14 D, 11, 12, 13, 30, 19 R; 280/289 D, 460 A, 512; 56/6, 7, 14.7, 15.6, 15.7

[56] References Cited

U.S. PATENT DOCUMENTS

| | | | |
|---|---|---|---|
| 613,834 | 11/1898 | Burnet | 280/289 D |
| 1,447,539 | 3/1923 | Fultz | 280/460 A |
| 2,212,958 | 8/1940 | Rea | 280/204 |
| 3,312,299 | 4/1967 | Kuecker | 280/204 |
| 3,598,426 | 8/1971 | Spiese | 280/204 |
| 3,832,834 | 9/1974 | Kovacs | 56/6 |
| 3,954,286 | 5/1976 | Weber | 280/512 |

*Primary Examiner*—Kenneth H. Betts
*Attorney, Agent, or Firm*—Robert D. Farkas

[57] ABSTRACT

A connecting bracket for connecting a lawn mower to a powered vehicle such as a motorcycle or the like including a first elongated rigid bracket for affixment to a lawn mower, an engaging element fixedly secured to the first bracket and providing an open-ended chamber therein, a second elongated rigid bracket for affixment to a powered vehicle, a ball element fixedly secured to the second bracket and adapted to be captured by the open-ended chamber, and means for removably retaining a portion of the ball element within the open-ended chamber.

6 Claims, 3 Drawing Figures

CONNECTING BRACKET ARRANGEMENT FOR TOWING LAWN MOWER

BACKGROUND OF THE INVENTION

1. Field of the Invention

The present invention relates to brackets for connecting powered vehicles to apparatuses which are designed to roll on the earth, and more particularly, to a connecting bracket for connecting a lawn mower to a powered vehicle such as a motorcycle or the like.

2. Description of the Prior Art

Brackets for connecting powered vehicles to apparatuses which are designed to roll on the earth are well known in the prior art. These brackets are characteristically fixedly secured on one end to the powered vehicles and on the other end to the apparatuses designed to be drawn thereby. Presently known brackets may not be easily and quickly disengaged when the apparatus is not in use. Also, when using these brackets in conjunction with powered vehicles traveling over uneven or rough terrain, the resultant movements of the apparatus may severely impair the stability of the powered vehicle. As a partial solution to this problem, pivotal or universal type joints have been introduced to the brackets. While these joints do alleviate some of the problem, the relief derived therefrom is substantially insignificant for many uses.

U.S. Pat. No. 2,517,162 issued to V. M. Arman on Aug. 1, 1950 discloses a trailer type motor attachment for bicycles which includes a bracket fixedly secured to the trailer and coupled through a universal joint to the saddle post of the bicycle. Although the universal joint affords some degree of coupling between the trailer and the bicycle, severe lateral movement of the trailer during use on rough terrain may upset the stability of the bicycle.

U.S. Pat. No. 3,848,890 issued to A. D. MacAlpine on Nov. 19, 1974 teaches a coupling for connecting the drawbar of a tandem trailer to the seat post of a bicycle frame which includes a clamp for clamping to the seat post, a link rotatably connected to the clamp for rotation about a substantially horizontal axis perpendicular to the axis of the seat post, a post fixed to the other end of the link on which the loop at the end of the drawbar is adapted to be pivotally mounted, a jaw pivotally mounted on the link adjacent the post having a hook at its end for engagement with the inside of the loop and a hole for engagement with the post, and a latchplate mounted on the jaw for releasably holding the hook engaged with the inner side of the loop and the hole engaged on the post. As in Arman, lateral movement of the tandem will disrupt the stability of the bicycle.

The present invention overcomes the problems associated with the prior art by providing a connecting bracket for connecting a lawn mower or a similar apparatus to a powered vehicle or the like which will prevent erratic movements of the apparatus from destabilizing the powered vehicle and which may be quickly and simply disengaged therefrom when the apparatus is not in use.

SUMMARY OF THE INVENTION

Therefore, a primary object of the present invention is to provide a connecting bracket for connecting a lawn mower or similar drawn apparatus to a motor vehicle or the like.

A further object is to provide a connecting bracket which will prevent erratic movements of the lawn mower resultant of travel over uneven terrain from having an adverse effect on the stability of the powered vehicle.

Still another object is to provide a connecting bracket which may be easily and quickly disconnected from the powered vehicle releasing the lawn mower when not in use.

A still further object is to provide a connecting bracket which is ideally suited for use in coupling a rotary type lawn mower to a motorcycle.

Another object is to provide a connecting bracket which is simple in design, inexpensive to manufacture, and durable.

These objects, as well as further objects and advantages, of the present invention will become readily apparent after reading the description of a non-limiting illustrative embodiment and the accompanying drawing.

A connecting bracket for connecting a lawn mower to a powered vehicle or the like according to the principles of the present invention includes a first elongated rigid bracket of affixment on a first end thereof to a lawn mower resting on the earth; an engaging element fixedly secured to the second end of the first elongated rigid bracket, the engaging element providing an open-ended chamber on a surface thereof, the chamber opening through the surface of the engaging element; a second elongated rigid bracket for affixment on a first end thereof to a powered vehicle resting on the earth; a ball element fixedly secured to the second end of the second elongated rigid bracket, the ball element providing a partially spherical surface dimensioned to be captured within the open-ended chamber; and means for removeably retaining the partially spherical surface within the open-ended chamber, the removable retaining means providing a bias means urged release lever.

BRIEF DESCRIPTION OF THE DRAWINGS

In order that the present invention may be more fully understood it will now be described, by way of example, with reference to the accompanying drawings in which.

DESCRIPTION OF THE PREFERRED EMBODIMENT

Figure 1:
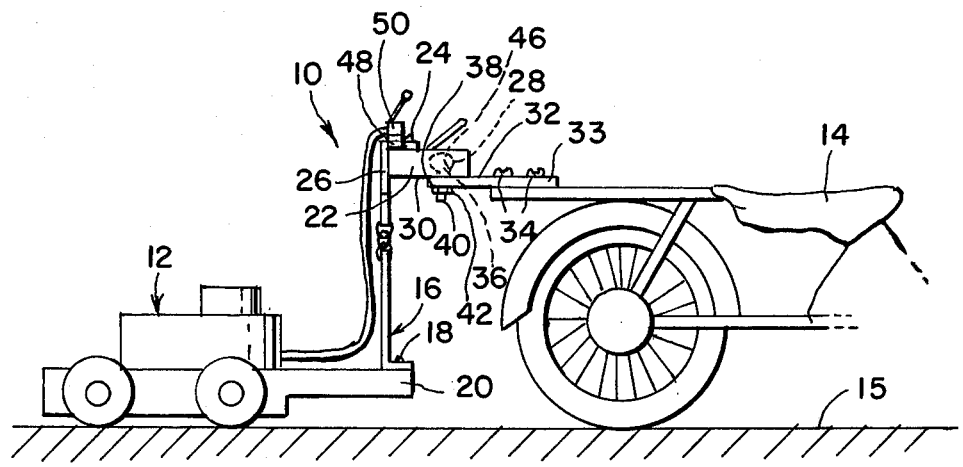
FIG. 1 is a side view in elevation of the preferred embodiment incorporating the principles of the present invention connecting a rotary lawn mower to a motorcycle.

Referring now to the figures, and more particularly to FIG. 1, there is illustrated therein a connecting bracket 10 which is connecting a rotary type lawn mower 12 to a motorcycle 14 both resting on the earth 15. The connecting bracket 10 includes a first elongated rigid bracket 16 which is fixedly secured by a plurality of bolts 18 to a housing 20 of the lawn mower 12. An engaging element 22 is fixedly secured by a plurality of bolts 24 to the second end 26 of the first bracket 16. The engaging element 22 provides an open-ended chamber 28 therein which opens through the surface 30 thereof as further illustrated in FIG. 3. The surface 30 preferably faces the earth 15 as shown.

Figure 3:
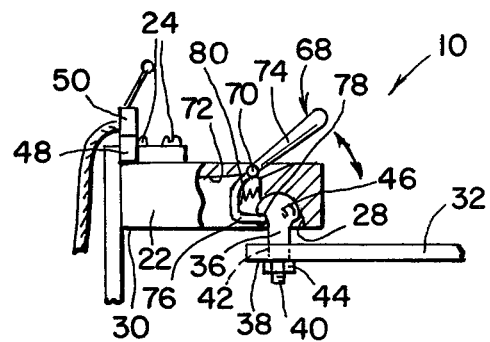
FIG. 3 is a fragmentary side view of the preferred embodiment partially broken away.

A second elongated rigid bracket 32 is fixedly secured on a first end 33 thereof to the motorcycle 14 by a plurality of bolts 34. A ball element 36 is mounted on the second end 38 of the second bracket 32. The ball element 36 provides a threaded portion 40 which is inserted through an aperture 42 provided in the second bracket 32 and is secured by a nut 44 as shown in FIG. 3. The ball element 36 provides a partially spherical surface 46 dimensioned to be captured within the open-ended chamber 28 as hereinafter described.

A throttle bracket 48 is fixedly secured to the engaging element 22 and is provided to retain the throttle assembly 50 of the lawn mower 12.

Figure 2:
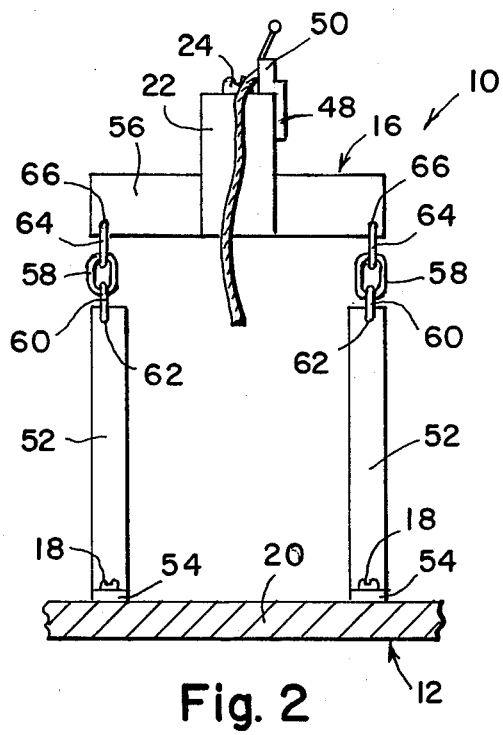
FIG. 2 is a rear view of the preferred embodiment.

FIG. 2 illustrates the construction of the first elongated rigid bracket 16. The bracket 16 is substantially "U" shaped as shown and includes a pair of legs 52 having free ends 54 and a base portion 56. The free ends 54 are fixedly secured to the housing 20 of the lawn mower 12 by the plurality of bolts 18. The base portion 56 is fixedly secured by the plurality of bolts 24 to the engaging element 22. The legs 52 are each severed from the base portion 56 and are reconnected by a set of interconnected links 58. The first ends 60 of the links 58 are affixed to the legs 52 through apertures 62 located therein. The second ends 64 of the links 58 are affixed to the base portion 56 through apertures 66.

FIG. 3 illustrates the open-ended chamber 28 of the engaging element 22 capturing the partially spherical surface 46 provided by the ball elment 36. A release lever 68 is pivotally affixed by a pivot 70 within an elongated aperture 72 located in the engaging element 22. The release lever 68 provides a handle portion 74 which extends outwardly from the elongated aperture 72 and a hooked portion 76 which extends into the open-ended chamber 28. The hooked portion 76 is dimensioned to selectively engage the surface 78 of the ball element 36 and is urged thereagainst by a helical compression spring 80. The spring 80 is fixedly secured on one end thereof to the lever 68 and on the other end thereof to the engaging element 22. When the handle portion 74 is pivoted in a direction to oppose the spring 80 the ball element 36 is released from the open ended chamber 28.

The bracket 10 may be constructed of steel, aluminum, or any other suitable material. As a result of the link sets 58, the motorcycle 14 is substantially unaffected by the movements of the lawn mower 12 as it follows therebehind. The bracket 10 may be used in conjunction with other powered vehicles as desired by the user.

It will be understood that various changes in the details, materials, arrangements of parts and operation conditions which have been herein described and illustrated in order to explain the nature of the invention may be made by those skilled in the art within the principles and scope of the invention.

Having thus set forth the nature of the invention, what is claimed is:

1. A connecting bracket for connecting a lawn mower to a powered vehicle or the like comprising:

a first elongated bracket for affixment on a first end thereof to a lawn mower resting on the earth;

an engaging element fixedly secured to the second end of said first elongated bracket, said engaging element providing an open-ended chamber on a surface thereof, said chamber opening through said surface;

a second elongated bracket for affixment on a first end thereof to a powered vehicle resting on said earth;

a ball element fixedly secured to the second end of said second elongated bracket, said ball element providing a partially spherical surface dimensioned to be captured within said open-ended chamber;

means for removeably retaining said partially spherical surface within said open-ended chamber, said removeable retaining means providing a bias means urged release lever; and wherein said first elongated bracket is substantially "U" shaped, including a pair of legs having free ends and a base portion, said pair of free ends of said "U" shaped first bracket being fixedly secured to said lawn mower, said base portion of said "U" shaped first bracket being fixedly secured to said engaging element, and wherein said legs of said "U" shaped first bracket are each severed from said base portion and are flexibly reconnected thereto by flexible connecting means.

2. A connecting bracket as claimed in claim 1, wherein said flexibly connecting means comprises at least two sets of interconnected links, each of said sets of links fixedly secured on a first end thereof to one of said legs, each one of said legs having at least one of said first ends fixedly secured thereto, the second end of each of said sets of links being fixedly secured to said base portion.

3. A connecting bracket as claimed in claim 1, wherein said removeable retaining means comprises a release lever pivotally affixed to said engaging element within an elongated aperture located therein, said release lever providing a handle portion extending outwardly from an elongated aperture and a hooked portion extending within said open-ended chamber, said hooked portion dimensioned to selectively engage said ball element when inserted in said open-ended chamber, said hooked portion being urged by said bias means against a surface of said ball element thereby retaining said ball element within said open-ended chamber, the pivoting of said handle portion in a direction opposing said bias means releasing said ball element from said open-ended chamber.

4. A connecting bracket as claimed in claim 3, wherein said bias means comprises a helical compression spring.

5. A connecting bracket as claimed in claim 1, further comprising a throttle bracket fixedly secured to said engaging element, said throttle bracket for retaining the throttle assembly of said lawn mower therein.

6. A connecting bracket as claimed in claim 1, wherein the surface of said engaging element providing said openended chamber faces said earth.

* * * * *